US011622005B2

(12) United States Patent
Liu

(10) Patent No.: US 11,622,005 B2
(45) Date of Patent: Apr. 4, 2023

(54) INTERNET OF THINGS SYSTEM, CENTRAL CONTROL DEVICE, APPLICATION DEVICE AND COMMUNICATION METHODS

(71) Applicant: BOE TECHNOLOGY GROUP CO., LTD., Beijing (CN)

(72) Inventor: Nan Liu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 58 days.

(21) Appl. No.: 16/651,140

(22) PCT Filed: Mar. 27, 2019

(86) PCT No.: PCT/CN2019/079886
§ 371 (c)(1),
(2) Date: Mar. 26, 2020

(87) PCT Pub. No.: WO2020/191669
PCT Pub. Date: Oct. 1, 2020

(65) Prior Publication Data
US 2021/0243259 A1 Aug. 5, 2021

(51) Int. Cl.
H04L 67/125 (2022.01)
G16Y 40/35 (2020.01)
(Continued)

(52) U.S. Cl.
CPC ............ H04L 67/125 (2013.01); G16Y 40/35 (2020.01); H04L 63/0428 (2013.01); H04L 67/62 (2022.05)

(58) Field of Classification Search
CPC ... H04L 67/125; H04L 67/328; H04L 67/025; H04L 63/0428; G16Y 40/35
(Continued)

(56) References Cited

U.S. PATENT DOCUMENTS 5,179,661 A * 1/1993 Copeland, III ........... H04L 9/40
710/29
5,442,658 A * 8/1995 Cuny .................... H04L 7/0045
375/362
(Continued)

FOREIGN PATENT DOCUMENTS

CN 1947109 A 4/2007
CN 103312753 A 9/2013
(Continued)

OTHER PUBLICATIONS

First Chinese Office Action from Chinese Patent Application No. 201980000404.1 dated Sep. 29, 2022.

Primary Examiner — Thu Ha T Nguyen
(74) Attorney, Agent, or Firm — Dilworth & Barrese, LLP.; Michael J. Musella, Esq.

(57) ABSTRACT

Disclosed is a system, central control device, an application device for the Internet of things and communication methods applied to the Internet of Things system. The Internet of Things includes the center control and a plurality of application devices, wherein the central control device includes: a central control unit configured to perform a central control function of the central control device under control of a first clock signal; an asynchronous communication unit configured to perform data communication between the central control device and a plurality of application devices in the Internet of Things by using an asynchronous circuit; a synchronous-asynchronous interface configured to perform data transmission between the central control unit and the asynchronous communication unit.

19 Claims, 9 Drawing Sheets

(51) Int. Cl.
  *H04L 9/40* (2022.01)
  *H04L 67/62* (2022.01)
(58) Field of Classification Search
  USPC .................................... 709/223, 224, 248
  See application file for complete search history.

(56) References Cited

U.S. PATENT DOCUMENTS

| | | | | | |
|---|---|---|---|---|---|
| 5,721,886 | A * | 2/1998 | Miller | ............... | G06F 1/08 713/400 |
| 5,987,081 | A * | 11/1999 | Csoppenszky | ............ | G06F 5/06 713/400 |
| 6,141,284 | A * | 10/2000 | Weinfurtner | ........ | G11C 11/4074 365/189.08 |
| 6,433,586 | B2 * | 8/2002 | Ooishi | ............... | H03K 3/35625 326/113 |
| 6,473,439 | B1 * | 10/2002 | Zerbe | ............... | H04L 7/0012 713/400 |
| 7,339,504 | B1 * | 3/2008 | Li | ............... | H03H 17/0628 341/60 |
| 8,379,669 | B2 * | 2/2013 | Suzuki | ............... | H04J 3/0641 370/466 |
| 8,516,290 | B1 * | 8/2013 | Thomas | ............... | G06F 13/405 713/400 |
| 9,768,776 | B1 * | 9/2017 | Lundberg | ......... | H03K 19/00315 |
| 9,979,435 | B1 * | 5/2018 | Hall | ............... | H04L 67/125 |
| 10,461,753 | B1 * | 10/2019 | Pritchard | ............... | H03L 7/00 |
| 10,892,995 | B2 * | 1/2021 | Shelton, IV | ............... | G16H 40/60 |
| 2002/0154658 | A1 * | 10/2002 | Song | ............... | H04N 21/4316 370/537 |
| 2003/0117881 | A1 * | 6/2003 | Johnson | ............... | G11C 7/22 365/194 |
| 2006/0129318 | A1 * | 6/2006 | Mizuguchi | ............... | H04L 7/005 702/1 |
| 2007/0277053 | A1 * | 11/2007 | Timmermans | ........ | G06F 13/405 713/401 |
| 2008/0165610 | A1 * | 7/2008 | Kim | ............... | G11C 11/413 365/233.1 |
| 2009/0160492 | A1 * | 6/2009 | Hailu | ............... | H03K 17/005 327/407 |
| 2009/0164957 | A1 * | 6/2009 | Hailu | ............... | G06F 30/35 716/113 |
| 2009/0300237 | A1 * | 12/2009 | Nobunaga | ............... | G11C 7/10 710/61 |
| 2011/0246809 | A1 * | 10/2011 | Dewhirst | ............... | G06F 1/12 713/400 |
| 2016/0070672 | A1 * | 3/2016 | Missoni | ............... | H04L 5/14 710/110 |
| 2016/0226732 | A1 * | 8/2016 | Kim | ............... | H04L 12/2807 |
| 2017/0155497 | A1 * | 6/2017 | Barrenscheen | ....... | H04L 7/0087 |
| 2017/0207907 | A1 * | 7/2017 | Anvekar | ............... | H04L 7/0012 |
| 2017/0223712 | A1 * | 8/2017 | Stephens | ............ | H04W 72/0446 |
| 2018/0028824 | A1 * | 2/2018 | Pivonka | ............... | A61N 1/36062 |
| 2018/0102779 | A1 * | 4/2018 | Behel | ............... | H03L 7/087 |
| 2018/0205804 | A1 * | 7/2018 | Kim | ............... | H04L 49/3081 |
| 2018/0309619 | A1 * | 10/2018 | Hall | ............... | H04L 41/5038 |
| 2019/0364492 | A1 * | 11/2019 | Azizi | ............... | H04W 48/16 |
| 2019/0372750 | A1 * | 12/2019 | Wang | ............... | H04W 56/001 |
| 2020/0225655 | A1 * | 7/2020 | Cella | ............... | G06N 3/0472 |
| 2020/0348662 | A1 * | 11/2020 | Cella | ............... | G05B 23/024 |
| 2021/0157312 | A1 * | 5/2021 | Celia | ............... | G06K 9/00637 |
| 2022/0247311 | A1 * | 8/2022 | Ortet | ............... | H02M 3/1566 |

FOREIGN PATENT DOCUMENTS

| | | |
|---|---|---|
| CN | 103414547 A | 11/2013 |
| CN | 106230878 A | 12/2016 |
| CN | 108123863 A | 6/2018 |
| CN | 108683715 A | 10/2018 |
| WO | 2018/125686 A2 | 7/2018 |

* cited by examiner

INTERNET OF THINGS SYSTEM, CENTRAL CONTROL DEVICE, APPLICATION DEVICE AND COMMUNICATION METHODS

TECHNICAL FIELD

The present disclosure relates to a field of Internet of things (IoT), and in particular to an Internet of Things system, a central control device and an application device in the Internet of Things system, and communication methods for the Internet of Things system.

BACKGROUND

The Internet of Things (IoT) is a hardware platform that connects devices and data networks, and processes a variety of data. In an existing IoT platform, communications between an application device and a central control device for the IoT may be achieved by providing interfaces.

SUMMARY OF THE DISCLOSURE

The present disclosure provides an Internet of Things system, a central control device and an application device in the Internet of Things system, and communication methods for the Internet of Things system.

According to an aspect of the present disclosure, it is provided a central control device for the Internet of Things comprising: a central control unit configured to perform a central control function of the central control device under control of a first clock signal; an asynchronous communication unit configured to perform data communication between the central control device and a plurality of application devices in the Internet of Things by using an asynchronous circuit; a synchronous-asynchronous interface configured to perform data transmission between the central control unit and the asynchronous communication unit.

In some embodiments, the central control unit is further configured to: transmit a request signal to one of the plurality of application devices via the asynchronous communication unit, the request signal indicating that the central control device wishes to transmit data to the application device; receive a response signal from the application device via the asynchronous communication unit, the response signal indicating that the application device is able to receive data transmitted by the central control device; and transmit data to the application device via the asynchronous communication unit in response to the response signal.

In some embodiments, the central control unit is further configured to: receive a request signal from one of the plurality of application devices via the asynchronous communication unit, the request signal indicating that the application device wishes to transmit data to the central control device; transmit a response signal to the application device via the asynchronous communication unit, the response signal indicating that the central control device is able to receive data transmitted by the application device; and receive data transmitted from the application device via the asynchronous communication unit.

In some embodiments, the synchronous-asynchronous interface is further configured to: receive a first data signal based on a first input data transmitted by the central control unit under the control of the first clock signal; generate a second data signal and a third data signal for representing the first input data according to the received first data signal, wherein the second data signal and the third data signal are complementary; transmit the second data signal and the third data signal to the asynchronous communication unit, wherein the asynchronous communication unit is configured to output a first output data corresponding to the first input data based on the second data signal and the third data signal.

In some embodiments, the synchronous-asynchronous interface is further configured to: receive a fourth data signal and a fifth data signal, transmitted by the asynchronous communication unit, based on a second input data, wherein the fourth data signal and the fifth data signal are complementary; generate a sixth data signal for representing the second input data according to the received fourth data signal and fifth data signal; transmit the sixth data signal to the central control unit, wherein the central control unit is configured to output a second output data corresponding to the second input data based on the sixth data signal under the control of the first clock signal.

In some embodiments, the asynchronous communication unit is configured to perform an encryption operation on data to be transmitted.

In some embodiments, the encryption operation currently performed in the asynchronous communication unit is scheduled so that a working power of the asynchronous communication unit at each moment is constant.

In some embodiments, scheduling the encryption operation currently performed in the asynchronous communication unit comprises: scheduling the currently performed encryption operation based on a pre-measured change in power consumption of the asynchronous communication unit over time when the asynchronous communication unit performs the encryption operation according to an algorithm.

In some embodiments, the asynchronous communication unit is further configured to perform a random operation in a process of performing data encryption to generate random power consumption.

According to another aspect of the present disclosure, it is provided an application device for the Internet of Things comprising: an application control unit configured to perform an application function of the application device based on a second clock signal; an asynchronous communication unit configured to perform data communication between the application device and a central control device for the Internet of Things by using an asynchronous circuit; a synchronous-asynchronous interface configured to perform data transmission between the application control unit and the asynchronous communication unit.

In some embodiments, the application control unit is further configured to: transmit a request signal to the central control device via the asynchronous communication unit, the request signal indicating that the application device wishes to transmit data to the central control device; receive a response signal from the central control device via the asynchronous communication unit, the response signal indicating that the central control device is able to receive data transmitted by the application device; and transmit data to the central control device via the asynchronous communication unit in response to the response signal.

In some embodiments, the application control unit is further configured to: receive a request signal from the central control device via the asynchronous communication unit, the request signal indicating that the central control device wishes to transmit data to the application device; transmit a response signal to the central control device via the asynchronous communication unit, the response signal indicating that the application device is able to receive data transmitted by the central control device; and receive data transmitted from the central control device via the asynchronous communication unit.

According to another aspect of the present disclosure, it is provided an Internet of Things system comprising a central control device and a plurality of application devices, wherein the central control device comprises: a central control unit configured to perform a central control function of the central control device based on a first clock signal; a first asynchronous communication unit configured to perform data communication between the central control device and the plurality of application devices by using an asynchronous circuit; a first synchronous-asynchronous interface configured to perform data transmission between the central control unit and the first asynchronous communication unit, each application device comprises: an application control unit configured to perform an application function of the application device based on a second clock signal; a second asynchronous communication unit configured to perform data communication between the application device and the central control device for the Internet of Things by using an asynchronous circuit; a second synchronous-asynchronous interface configured to perform data transmission between the application control unit and the second asynchronous communication unit.

According to another aspect of the present disclosure, it is provided a communication method applied to the central control device, comprising: transmitting a request signal to an application device for the Internet of Things via the asynchronous communication unit, the request signal indicating that the central control device wishes to transmit data to the application device; receiving a response signal from the application device via the asynchronous communication unit, the response signal indicating that the application device is able to receive data transmitted by the central control device; and transmitting data to the application device via the asynchronous communication unit in response to the response signal.

According to another aspect of the present disclosure, it is provided a communication method applied to the central control device, comprising: receiving a request signal from an application device for the Internet of Things via the asynchronous communication unit, the request signal indicating that the application device wishes to transmit data to the central control device; transmitting a response signal to the application device via the asynchronous communication unit, the response signal indicating that the central control device is able to receive data transmitted by the application device; and receiving data transmitted from the application device via the asynchronous communication unit.

According to another aspect of the present disclosure, it is provided a communication method applied to the application device, comprising: transmitting a request signal to a central control device for the Internet of Things via the asynchronous communication unit, the request signal indicating that the application device wishes to transmit data to the central control device; receiving a response signal from the central control device via the asynchronous communication unit, the response signal indicating that the central control device is able to receive data transmitted by the application device; and transmitting data to the central control device via the asynchronous communication unit in response to the response signal.

According to another aspect of the present disclosure, it is provided a communication method applied to the application device, comprising: receiving a request signal from a central control device for the Internet of Things via the asynchronous communication unit, the request signal indicating that the central control device wishes to transmit data to the application device; transmitting a response signal to the central control device via the asynchronous communication unit, the response signal indicating that the application device is able to receive data transmitted by the central control device; and receiving data transmitted from the central control device via the asynchronous communication unit.

BRIEF DESCRIPTION OF THE DRAWINGS

In order to explain the technical solution of embodiments of the present disclosure more clearly, accompanying drawings used in description of the embodiments will be briefly introduced below. Obviously, the accompanying drawings in the following description are merely some of the embodiments of the present disclosure. Those skilled in the art may further obtain other accompanying drawings according to these accompanying drawings without creative effort. The following drawings are not deliberately drawn to scale according to actual size, and focus on illustrating the gist of the present disclosure.

DESCRIPTION OF THE EMBODIMENTS

In order to make objectives, technical solutions and advantages of the embodiments of the present disclosure clearer, the present disclosure will be further described in details below with the embodiments. Obviously, the described embodiments are only a part but not all of the embodiments of the present disclosure. All other embodiments obtained by a person of ordinary skill in the art based on the embodiments of the present disclosure without creative effort shall fall within the scope of the present disclosure.

Technical terms or scientific terms used herein are intended to have the ordinary meaning as understood by those of ordinary skill in the art to which the present disclosure belongs, unless otherwise defined. Words such as "first", "second" and the like used in the present disclosure do not denote any sequence, quantity or priority, but are used to distinguish different components. Likewise, words such as "include", "comprise" and the like mean that an element or an object before these words contain elements, objects or alternatives thereof listed thereinafter, without excluding other elements or objects. Words such as "connection", "connected" and the like are not restricted to physical or mechanical connections, but may include electrical connections, regardless of direct or indirect connections. "Up", "down", "left", "right", etc. are only used to indicate relative positional relationships, and when absolute position of the described object changes, the relative positional relationships may also change accordingly.

With development of information technologies, especially Internet technologies, the Internet of Things (IoT) technology used to realize informationization, remote management control and intelligent networks is gradually maturing. The IoT connects sensors, controllers, machines, people, and things in a new way by using communication technologies such as local networks or the Internet, forming a connection between people and things, things and things. The IoT is an extension of the Internet, including the Internet and all resources on the Internet, and is compatible with all applications of the Internet. With application of the IoT technology in various fields, a variety of new application fields such as smart home, smart transportation, and smart health have appeared.

Figure 1:
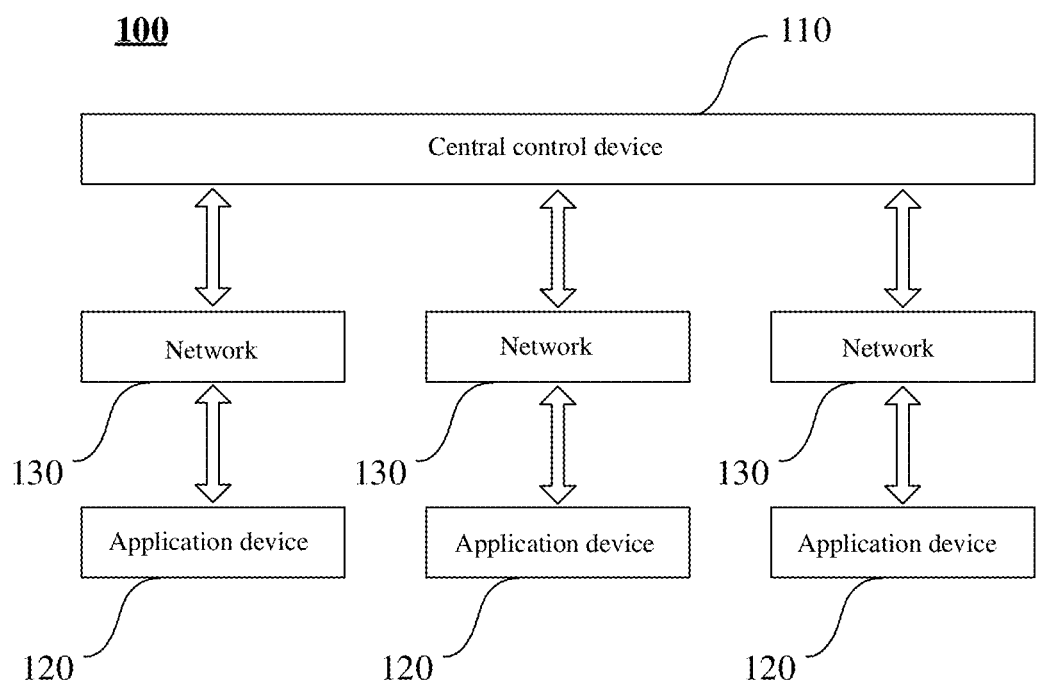
FIG. 1 shows a schematic architecture diagram of the Internet of Things according to the present disclosure.

FIG. 1 shows a schematic diagram of an Internet of Things system according to some embodiments of the present disclosure. As shown in FIG. 1, various application devices 120 serving as terminals access a network 130, and access a central control device 110 through the network 130. In some embodiments, the central control device 110 may support various applications, thereby a terminal+network+application architecture is formed. For example, in the field of smart home, various home appliances may access a general service platform serving as a central control device by using a local area network (LAN), such as, in a wireless or wired manner. Optionally, the local area network may be a personal area network (PAN). For example, taking a wireless personal area network (WPAN) as an example, various technologies such as Bluetooth, IrDA, Home RF, ZigBee, or UWB (Ultra-Wideband Radio) may be adopted to achieve access.

As mentioned earlier, when an IoT entity, such as a software module in an IoT application device, transmits data or information to a common service entity, the data or information may be stored as a separate resource. Furthermore, the IoT entity may transmit a request to the common service entity to update resources corresponding to the IoT entity stored on the common service entity, so as to reflect a status of the device running on the IoT entity. This update may be real-time or periodic, or it may be triggered by a certain condition. Therefore, other IoT entities communicating with the common service entity may learn the status of the device corresponding to the IoT entity by accessing updated resources; or, other IoT entities communicating with the common service entity may operate on the updated resources. It should be noted that the resources referred to herein include resources of various entities (for example, entities that may be embodied as software modules in IoT devices, such as AEs, CSEs and the like). An entity may represent a software module of a communication device, the common service entity may represent a software module of a central control device, and a service platform may be local or remote. Optionally, operating on the updated resources includes, for example, obtaining information of the updated resources, deleting information of the updated resources, notifying a third party of information of the updated resources, or operating on other resources based on information of the updated resources.

In the IoT system, a central control device may be used to implement the above service platform, and a client device may be used to implement the above terminal device.

Figure 2:
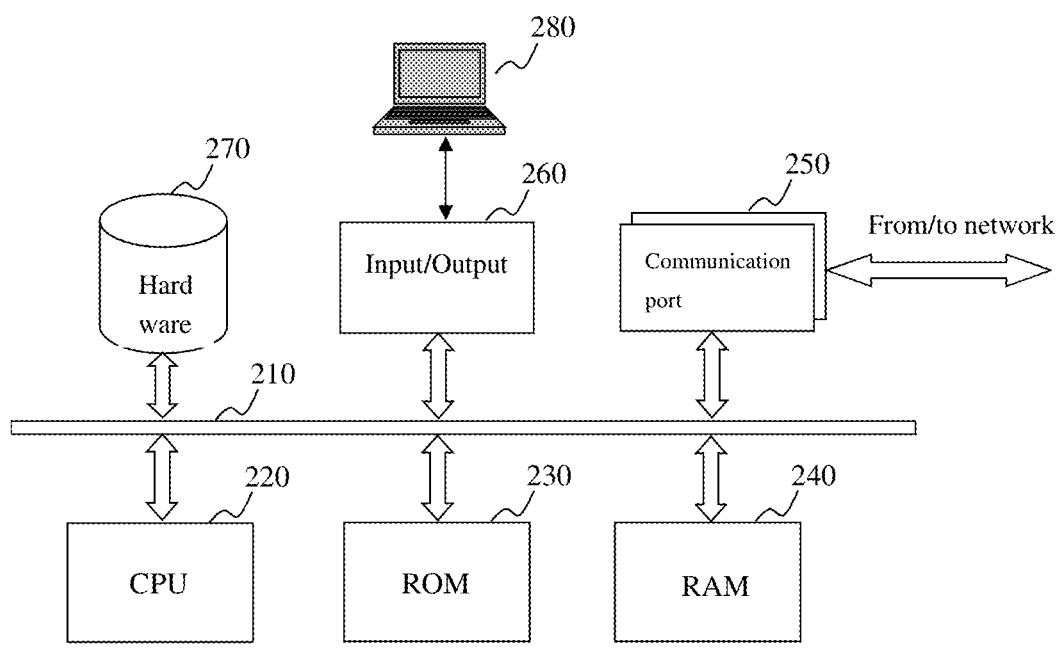
FIG. 2 shows a schematic diagram of an architecture of a computer device according to some embodiments of the present disclosure.

FIG. 2 is a schematic diagram of an architecture of a computer device according to some embodiments of the present disclosure. Such a computer device may be used to implement the server device or the client device (the central control device and the application device) disclosed in the present disclosure. Such computers may include personal computers, laptops, tablets, mobile phones, personal digital assistances (PDAs), smart glasses, smart watches, smart rings, smart helmets, and any smart portable or wearable devices. In some embodiments, the architecture of the computing device shown in FIG. 2 may also be used to implement various smart terminal devices in the IoT system, such as smart switches, smart gateways, smart rice cookers, smart purifiers, smart water meters, fire detectors, industrial automation equipment, and the like. The specific system in this embodiment uses a functional block diagram to explain a hardware platform including a user interface. Such a computer device may be a general-purpose computer device, or a special-purpose computer device. Both computer devices may be used to implement the server device or the client device of the terminal in this embodiment. A computer system 200 may implement any of the components currently described that provide information required for IoT communications. For example, the computer system 200 may be implemented by a computer device through its hardware devices, software programs, firmware, and combinations thereof. For convenience, only one computer device is drawn in FIG. 2, but the related computer functions described in this embodiment that provide information required for IoT communications may be implemented in a distributed manner by a set of similar platforms, thereby dispersing a processing load of the system.

The computer system 200 may comprise a communication port 250 to which a network for data communication is connected. The computer system 200 may further comprise at least one processor 220 for executing program instructions. The computer 200 may comprise an internal communication bus 210. The computer 200 may comprise different forms of program storage units and data storage units, such as a hard disk 270, a read-only memory (ROM) 230, a random access memory (RAM) 240, which may be used to store various data files used for computer processing and/or communication and possible program instructions executed by the processor 220. The computer system 200 may further comprise an input/output component 260 to support input/output data flow between the computer system 200 and other components (such as a user interface 280). The computer system 200 may also transmit and receive information and data through the communication port 250.

The processor 220 may be a Central Processing Unit (CPU), a Field Programmable Gate Array (FPGA), a Single-Chip Microcomputer (MCU), a Digital Signal Processor (DSP), an Application-Specific Integrated Circuit (ASIC) and other logic operation device with data processing ability and/or program execution ability.

In some embodiments, the computer system 200 described above may be used to constitute a server in an IoT communication system. The server of the IoT communication system may be a server hardware device or a server group. Respective servers in one server group may be connected through a wired or wireless network. A server group may be centralized, such as a data center. A server group may also be distributed, such as a distributed system.

The application device and the central control device involved in the present disclosure may be implemented using the computing device provided in FIG. 2.

Different aspects of the method of providing information required for data communication of the IoT communication and/or a method of implementing other steps by a program have been outlined above. The program part in the technology may be considered as a "product" or "manufacture" existing in the form of executable code and/or related data, which participates or is realized through a computer-readable medium. Tangible, permanent storage media may include memories or storages used by any computers, processors, or similar devices or related modules, for example, various semiconductor memories, magnetic tape drives, magnetic disk drives or any similar devices capable of providing storage functions for software.

The IoT platform is generally implemented based on software and extensions to a cloud platform (such as providing additional hardware interfaces). In the technologies known to the inventors, the IoT platform and devices therein are based on synchronous circuits. With continuous development of the IoT platform, its security and power consumption issues will become more and more important issues. In order to improve security of the IoT platform and reduce power consumption of the IoT platform, the present disclosure provides a globally synchronized and locally asynchronized IoT system, which implements communication between respective devices within the IoT platform through asynchronous circuits, thereby improving security of the IoT, effectively reducing computing pressure of a central processing unit, and reducing power consumption of the IoT platform.

Figure 3A:
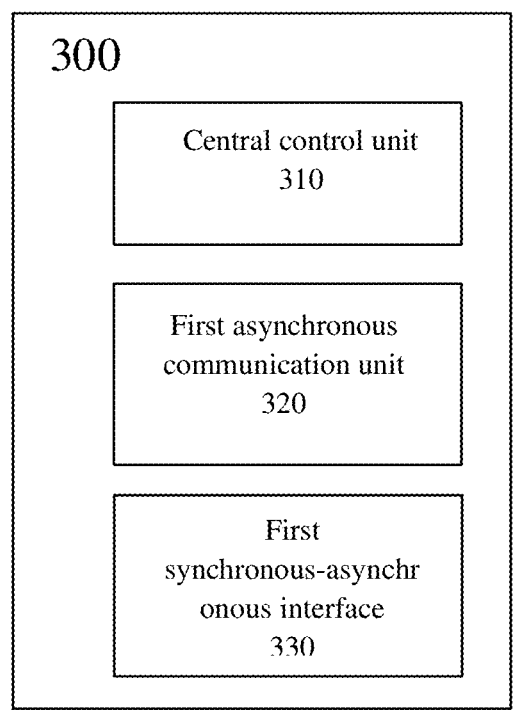
FIG. 3A shows a schematic block diagram of a central control device for the Internet of Things according to some embodiments of the present disclosure.

FIG. 3A shows a schematic block diagram of a central control device for the Internet of Things according to some embodiments of the present disclosure. As shown in FIG. 3A, the central control device 300 may comprise a central control unit 310 configured to perform a central control function of the central control device under control of a first clock signal. For example, the central control device may receive respective data transmitted from the application device, and process the data transmitted by the application device according to a preset program. For example, when the application device is a smart water meter, the central control function may comprise receiving water meter data periodically (such as weekly, monthly, etc.) transmitted by the smart water meter, and recording the water meter data. As another example, when the application device is a fire detector, the central control function may comprise receiving an alarm signal transmitted by the fire detector and performing an alarm function, such as notifying the fire department of the time and place of the fire. Further, the central control device may also transmit a control signal for spraying water to the fire detector. As another example, when the application device is a factory machine, the central control device may receive and record work data transmitted by the factory machine. Further, the central control device may also monitor the received work data and process abnormal data when the abnormal data is monitored. As another example, the central control device may also receive an encryption request transmitted by the application device, encrypt the data transmitted by the application device, and feed back the encrypted data to the application device.

As mentioned earlier, the central control unit 310 may perform instructions under the control of the first clock signal and implement the central control function of the central control device. Although not explicitly shown in FIG. 3A, those skilled in the art may understand that the central control device 300 may comprise a clock-signal generating unit for generating the first clock signal, such as a clock generator.

As shown in FIG. 3A, the central control device 300 may further comprise a first asynchronous communication unit 320 configured to perform data communication between the central control device, and a plurality of application devices using an asynchronous circuit. In some embodiments, the first asynchronous communication unit 320 may include an asynchronous circuit signal amplifier and/or an asynchronous circuit router. The asynchronous circuit signal amplifier may amplify data to be transmitted through the first asynchronous communication unit 320, and the asynchronous circuit router may route data to be transmitted through the first asynchronous communication unit 320.

As shown in FIG. 3A, the central control device 300 may further comprise a first synchronous-asynchronous interface 330 configured to perform data transmission between the central control unit and the first asynchronous communication unit. In some embodiments, the synchronous-asynchronous interface 330 may be used to convert data generated by the central control unit 310 (i.e., data transmitted based on the first clock signal) into data suitable for transmission using the first asynchronous communication unit (i.e., data transmitted using the asynchronous circuit). For example, a data-driven clocking scheme may be used to implement the conversion between data transmission of a synchronous circuit and data transmission of the asynchronous circuit.

Figure 3B:
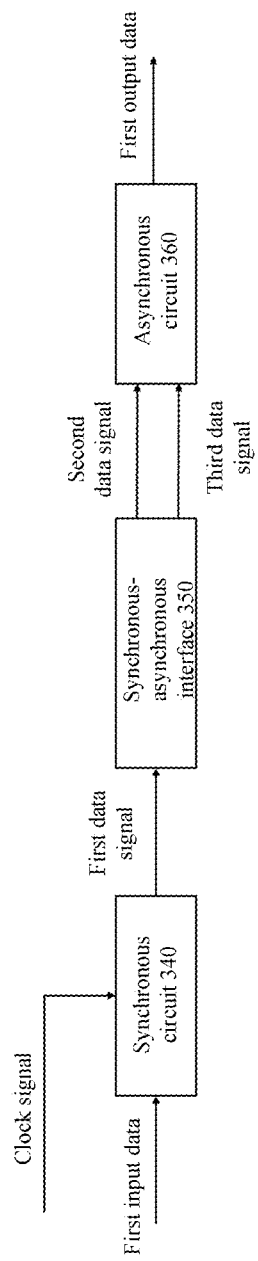
FIG. 3B and FIG. 3C shows schematic diagrams of a working principle of a data-driven clocking-based scheme of a synchronous-asynchronous interface according to some embodiments of the present disclosure.
Figure 3C:
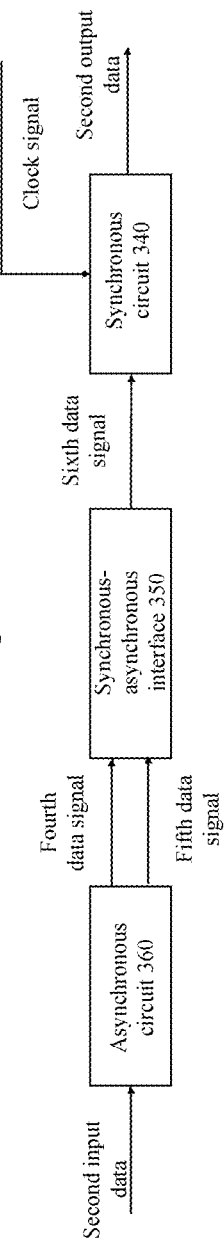

FIG. 3B and FIG. 3C show schematic diagrams of a working principle of a data-driven clocking-based scheme of the synchronous-asynchronous interface according to some embodiments of the present disclosure.

The synchronous-asynchronous interface may be used to connect a synchronous circuit and an asynchronous circuit, and realize data transmission between the synchronous circuit and the asynchronous circuit. As shown in FIG. 3B, the synchronous-asynchronous interface 350 may be connected between the synchronous circuit 340 and the asynchronous circuit 360. The synchronous circuit 340 may be, for example, the central control unit 310 shown in FIG. 3A. The asynchronous circuit 360 may be, for example, the first asynchronous communication unit shown in FIG. 3A. According to the working principle of the synchronous circuit, the synchronous circuit 340 is connected with an input data signal line and a clock signal line. For example, as shown in FIG. 3B, the synchronous circuit 340 may receive a first input data and a clock signal. Under control of the clock signal, the synchronous circuit 340 may output a first data signal according to the first input data. The synchronous-asynchronous interface 350 may be configured to receive the first data signal output by the synchronous circuit, and simultaneously output a second data signal and a third data signal to the asynchronous circuit 360 according to the received first data signal. In some embodiments, one of the second data signal and the third data signal is a signal same as the first data signal, and the other is a signal opposite to the first data signal. Therefore, the second data signal and the third data signal are two complementary signals.

In some embodiments, a correspondence relationship between the first data signal and the second data signal, the third data signal may be predefined. Taking digital circuit signals as an example, when the first data signal is 1, the second data signal may be 1, and the third data signal may be 0. When the first data signal is 0, the second data signal may be 0, and the third data signal may be 1. The asynchronous circuit 360 may be configured to generate a first output data corresponding to the first input data for the subsequent communication process according to the complementary second data signal and third data signal, without the control of the clock signal. Therefore, with the structure shown in FIG. 3B, the conversion between data transmission of the synchronous circuit and data transmission of the asynchronous circuit may be realized.

Similar to FIG. 3B, FIG. 3C shows a conversion process of data transmission from the asynchronous circuit to the synchronous circuit. As shown in FIG. 3C, the asynchronous circuit 360 may receive a second input data and output a fourth data signal and a fifth data signal according to the second input data, where the fourth data signal and the fifth data signal are complementary signals. For example, when the fourth data signal is 1, the fifth data signal may be 0. Similarly, when the fourth data signal is 0, the fifth data signal may be 1.

The synchronous-asynchronous interface 350 may be configured to output a sixth data signal to the synchronous circuit 340 according to the received fourth data signal and fifth data signal. In some embodiments, a correspondence relationship between the sixth data signal and the fourth data signal, the fifth data signal may be predefined. Taking digital circuit signals as an example, when the fourth data signal is 1 and the fifth data signal is 0, the sixth data signal may be 1. When the fourth data signal is 0 and the fifth data signal is 1, the sixth data signal may be 0. According to the received sixth data signal, the synchronous circuit 340 may output a second output data under the control of the clock signal.

Referring back to FIG. 3A, in some embodiments, when the central control device is ready to transmit data to an application device in the IoT, a communication connection between the central control device and the application device may be established based on a handshake signal. For example, the central control unit 310 is further configured to: transmit a request signal to one of the at least one application device via the first asynchronous communication unit, the request signal indicating that the central control device wishes to transmit data to the application device; receive a response signal from the application device via the first asynchronous communication unit, the response signal indicating that the application device is able to receive data transmitted by the central control device; and transmit data to the application device via the first asynchronous communication unit in response to the response signal.

In some embodiments, when an application device in the IoT is ready to transmit data to the central control device, a communication connection between the application device and the central control device may also be established based on a handshake signal. For example, the central control unit 310 is further configured to: receive a request signal from one of the plurality of application devices via a first asynchronous communication unit, the request signal indicating that the application device wishes to transmit data to the central control device; transmit a response signal to the application device via the asynchronous communication unit, the response signal indicating that the central control device is able to receive data transmitted by the application device; and receive data transmitted from the application device via the first asynchronous communication unit.

With the above method, the central control device may use a handshake signal to implement data transmission in an asynchronous manner with the application device. In the embodiment provided by the present disclosure, the central control device and application devices in the IoT do not need to implement data transmission based on the same clock, and thus is unpredictable, thereby improving security of data transmission in the IoT.

In some embodiments, the first asynchronous communication unit 320 may be further configured to perform operations on data to be transmitted according to one or more algorithms, such as performing an encryption operation. For example, an encryption algorithm may be Message-Digest Algorithm 5 (MD5), BASE 64, Data Encryption Standard (DES), Advanced Encryption Standard (AES), Secure Hash Algorithm (SHA1), Elliptic Curve Cryptography (ECC), and so on.

In some embodiments, the central control device 300 may schedule an operation currently performed in the first asynchronous communication unit, so that the working power of the first asynchronous communication unit 320 at each moment is constant. For example, a currently performed encryption operation may be scheduled based on a pre-measured change in power consumption of the first asynchronous communication unit 320 over time when the first asynchronous communication unit 320 performs the encryption operation according to the algorithm.

In some embodiments, a power consumption library of algorithms for the first asynchronous communication unit 320 may be determined by pre-measuring and recording a variation law of the power consumption with time when the first asynchronous communication unit 320 executes each algorithm. In an actual working process, the first asynchronous communication unit 320 may simultaneously execute a plurality of algorithms at a same moment. Therefore, the algorithm execution process of the asynchronous communication unit 320 may be globally scheduled according to the pre-recorded power consumption library, so that a global power consumption of the first asynchronous communication unit 320 is smooth, thereby effectively increasing the difficulty of cracking side-channel attacks of power consumption.

As an example, Table 1 shows the result of scheduling the first asynchronous communication unit 320 according to the pre-recorded algorithm power consumption. It can be seen that, as shown in Table 1, the power consumption of the first asynchronous communication unit after scheduling is consistent at each moment, so it would be impossible for an attacker to utilize different power consumptions of the circuit during signal conversion to crack the password.

TABLE 1

| Time | Power consumption (mW) | | |
|---|---|---|---|
| (ns) | Algorithm 1 | Algorithm 2 | Algorithm 3 |
| 1 | 2 | 0 | 2 |
| 2 | 1 | 2 | 1 |
| 3 | 1 | 1 | 2 |
| 4 | 3 | 0 | 1 |
| 5 | 4 | 0 | 0 |
| 6 | 1 | 2 | 1 |

In some examples, during the process of performing data encryption, the first asynchronous communication unit 320 may further be configured to perform a random operation to generate random power consumption, thereby changing the variation law of the power consumption of the circuit over time during the circuit's execution of a preset algorithm so that it would be impossible for an attacker to utilize different power consumptions of the circuit during signal conversion to crack the password.

Figure 4:
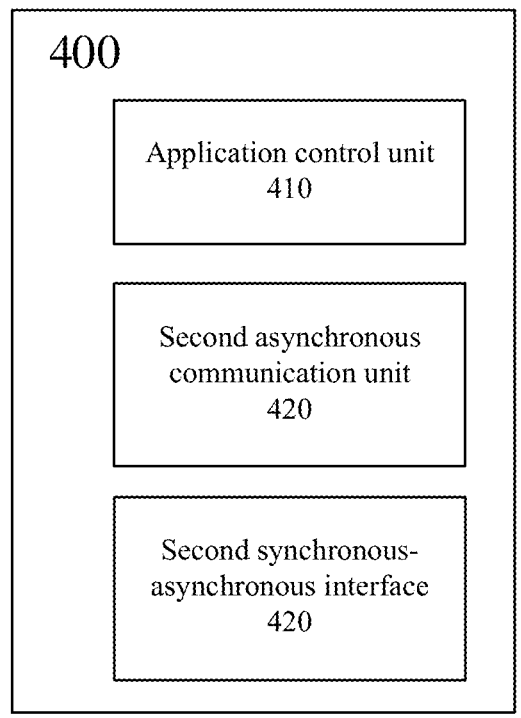
FIG. 4 shows a schematic block diagram of an application device for the Internet of Things according to some embodiments of the present disclosure.

FIG. 4 shows a schematic block diagram of an application device for the Internet of Things according to some embodiments of the present disclosure.

As shown in FIG. 4, the application device 400 may comprise an application control unit 410 that may be configured to perform an application function of the application device 400 based on a second clock signal. For example, when the application device is a smart water meter, the application device may record the water meter data and transmit the recorded water meter data to a central control device periodically (such as weekly, monthly, etc.). As another example, when the application device is a fire detector, the application device may monitor surrounding environmental characteristics such as temperature, humidity, smoke and the like, and transmit an alarm signal to the central control device when an abnormality is monitored. Further, the application device may also receive a control signal for spraying water transmitted by the central control device and perform a water spray operation. As another example, when the application device is a factory machine, the application device may record work data of the machine and transmit the work data to the central control device. As another example, the application device may transmit a data encryption request to the central control device according to an actual situation, and receive the encrypted data from the central control device.

As mentioned earlier, the application control unit 410 may perform instructions for implementing the application function under the control of the second clock signal. Although not explicitly shown in FIG. 4, those skilled in the art may understand that the application device 400 may comprise a clock-signal generating unit for generating the second clock signal. In some embodiments, the second clock signal used to control the application device 400 and the first clock signal used to control the central control device are different. When there are a plurality of application devices in the IoT system, respective second clock signals used to control respective application devices may also be different.

As shown in FIG. 4, the application device 400 may further comprise a second asynchronous communication unit 420 configured to perform data communication between the application device and the central control device of the IoT using an asynchronous circuit. In some embodiments, the second asynchronous communication unit 420 may include an asynchronous circuit signal amplifier and/or an asynchronous circuit router. The asynchronous circuit signal amplifier may amplify data to be transmitted through the second asynchronous communication unit 420, and the asynchronous circuit router may route data to be transmitted through the second asynchronous communication unit 420. In some embodiments, the second asynchronous communication unit 420 of the application device 400 and the second asynchronous communication unit 320 of the central control device 300 may be the same or different, for example, they may be separately designed according to specific functions to be implemented by the application device or the central control device.

As shown in FIG. 4, the application device 400 may further comprise a second synchronous-asynchronous interface 430 configured to perform data transmission between the application control unit and the second asynchronous communication unit. In some embodiments, the second synchronous-asynchronous interface 430 may be used to convert data generated by the application control unit 410 (i.e., data transmitted based on the second clock signal) into data suitable for transmission using the second asynchronous communication unit (i.e., data transmitted using the asynchronous circuit). For example, a data-driven clocking scheme may be used to implement the conversion between data transmission of a synchronous circuit and data transmission of the asynchronous circuit. For example, the second synchronous-asynchronous interface 430 may work according to the principle of the synchronous-asynchronous interface shown in FIGS. 3B and 3C, which will not be repeatedly described herein.

In some embodiments, when the application device in the IoT is ready to transmit data to a central control device, a communication connection between the application device and the central control device may be established based on a handshake signal. The application control unit 410 is further configured to: transmit a request signal to the central control device via the second asynchronous communication unit, the request signal indicating that the application device wishes to transmit data to the central control device; receive a response signal from the central control device via the second asynchronous communication unit, the response signal indicating that the central control device is able to receive data transmitted by the application device; and transmit data to the central control device via the second asynchronous communication unit in response to the response signal.

In some embodiments, when a central control device is ready to transmit data to the application device in the IoT, a communication connection between the central control device and the application device may also be established based on a handshake signal. The application control unit 410 is further configured to: receive a request signal from the central control device via the second asynchronous communication unit, the request signal indicating that the central control device wishes to transmit data to the application device; transmit a response signal to the central control device via the second asynchronous communication unit, the response signal indicating that the application device is able to receive data transmitted by the central control device; and receive data transmitted from the central control device via the second asynchronous communication unit.

With the above method, the central control device may use a handshake signal to implement data transmission in an asynchronous manner with the application device. In the embodiment provided by the present disclosure, the central control device and application devices in the IoT do not need to implement data transmission based on the same clock, and thus is unpredictable, thereby improving security of data transmission in the IoT.

In some embodiments, the second asynchronous communication unit of the application device may also perform global scheduling on instructions executed therein, so that a variation law of power consumption of the second asynchronous communication unit with time is smooth or random, thereby preventing attackers from utilizing different power consumptions of the circuit during signal conversion to crack the password.

With the central control device and the application device provided by the present disclosure, data communication between the central control device and a plurality of application devices may be performed through asynchronous circuits, thereby achieving higher stability and lower power consumption. Furthermore, since data transmission between the central control device and the application devices in the IoT system is not controlled by a global clock, data transmission between systems is unpredictable, which may prevent side-channel attacks based on time, making the system has higher security. Further, by recording a variation law of power consumption of an asynchronous circuit with time when the asynchronous circuit executes a specific algorithm, global scheduling may be performed so that a global power consumption of the asynchronous circuit is smooth or random, thereby improving security of system data encryption.

Figure 5:
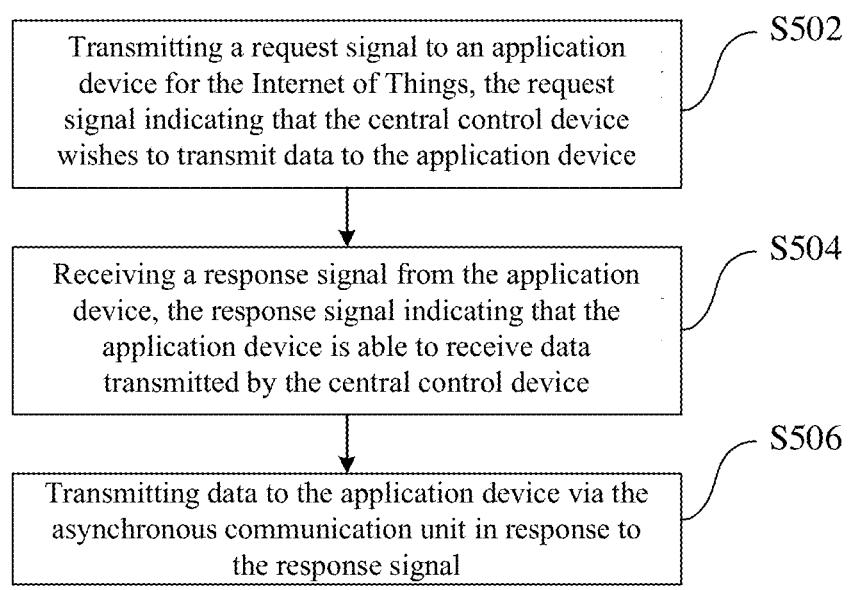
FIG. 5 shows a flowchart of a communication method for transmitting data applied to a central control device in the Internet of Things according to some embodiments of the present disclosure.

FIG. 5 shows a flowchart of a communication method for transmitting data applied to a central control device in the Internet of Things as described above according to some embodiments of the present disclosure.

As shown in FIG. 5, when the central control device is ready to transmit data to an application device in the IoT, in step S502, a request signal is transmitted to the application device in the IoT, the request signal indicating that the central control device wishes to transmit data to the application device. In some embodiments, the central control device may transmit the request signal to the application device. In some embodiments, the request signal may be transmit via a first asynchronous communication unit. As mentioned earlier, the first asynchronous communication unit may include an asynchronous circuit signal amplifier and/or an asynchronous circuit router. For example, the request signal transmitted by the central control device may be routed to the application device through a router formed by an asynchronous circuit. In some embodiments, communication links between the central control device and respective application devices for the IoT are constituted by routers formed by asynchronous circuits. With this method, data may be exchanged between respective devices in the IoT through asynchronous circuits.

In step S504, a response signal from the application device may be received, where the response signal indicates that the application device is able to receive data transmitted by the central control device. In some embodiments, the above response signal may be received using the asynchronous communication unit as mentioned earlier.

Since the central control device and the application device do not work based on a same clock signal, in order to achieve data exchange between the central control device and the application device, a handshake signal may be implemented with steps S502 and S504, thereby enabling data to be transmitted can be received successfully.

In step S506, data may be transmitted to the application device in response to the response signal. In some embodiments, a central control unit of the central control device may be used to determine the data to be transmitted to the application device, for example, may read the data to be transmitted from a storage unit (not shown) of the central control device, convert the data to be transmitted into a form that can be transmitted through the asynchronous circuit using a first synchronous-asynchronous interface of the central control device, and transmit the data to the application device via the first asynchronous communication unit. The first synchronous-asynchronous interface may work according to the principle shown in FIG. 3B and FIG. 3C, which will not be repeatedly described herein.

Figure 6:
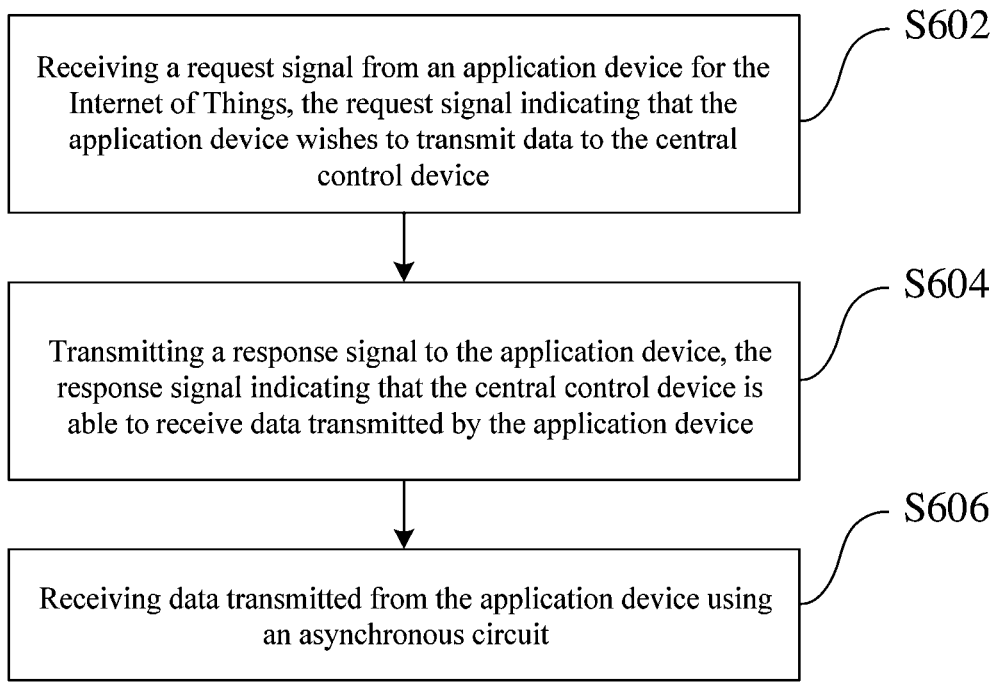
FIG. 6 shows a flowchart of a communication method for receiving data applied to a central control device in the Internet of Things according to some embodiments of the present disclosure.

FIG. 6 shows a flowchart of a communication method for receiving data applied to a central control device in the Internet of Things as described above according to some embodiments of the present disclosure.

In step S602, a request signal from an application device for the IoT may be received via a first asynchronous communication unit, the request signal indicating that the application device wishes to transmit data to the central control device.

In step S604, a response signal may be transmitted to the application device via the first asynchronous communication unit, the response signal indicating that the central control device is able to receive data transmitted by the application device.

By implementing a handshake signal with steps S602 and S604, the central control device can successfully receive data transmitted by the application device.

In step S606, data transmitted from the application device may be received via the first asynchronous communication unit. As mentioned before, data exchange between respective devices in the IoT may be achieved through the first asynchronous communication unit formed by an asynchronous circuit.

In some embodiments, the central control device may receive data transmitted by the application device through the first asynchronous communication unit, and convert the received data into a form that is easily processed by a synchronous circuit by a first synchronous-asynchronous interface, so that a central control unit of the central control device may perform subsequent processing such as encryption, storage, forwarding and the like on the received data based on a first clock signal.

With the central control device and the application device provided by the present disclosure, data communication between the central control device and a plurality of application devices may be performed through asynchronous circuits, thereby higher stability and lower power consumption are realized. Furthermore, since data transmission between the central control device and the application devices in the IoT system is not controlled by a global clock, data transmission between systems is unpredictable, which may prevent side-channel attacks based on time, making the system has higher security.

Figure 7:
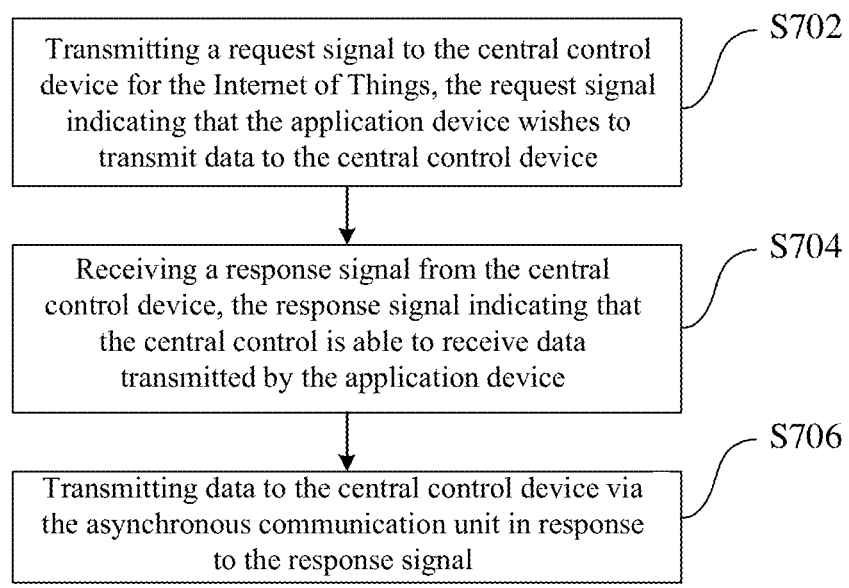
FIG. 7 shows a flowchart of a communication method for transmitting data applied to an application device in the Internet of Things according to some embodiments of the present disclosure.

FIG. 7 shows a flowchart of a communication method for transmitting data applied to an application device in the Internet of Things according to some embodiments of the present disclosure.

As shown in FIG. 7, in step S702, a request signal may be transmitted to a central control device for the IoT via a second asynchronous communication unit, the request signal indicating that the application device wishes to transmit data to the central control device.

In step S704, a response signal from the central control device may be received via the second asynchronous communication unit, the response signal indicating that the central control device is able to receive data transmitted by the application device.

By implementing a handshake signal with steps S702 and S704, the central control device can successfully receive data transmitted by the application device.

In step S706, data may be transmitted to the central control device via the second asynchronous communication unit in response to the response signal. As mentioned earlier, data exchange between respective devices in the IoT may be realized through the second asynchronous communication unit formed by an asynchronous circuit.

In some embodiments, an application control unit of the application device may be used to determine data to be transmitted to the central control device, for example, may read the data to be transmitted from a storage unit (not shown) of the application device, convert the data to be transmitted into a form that can be transmitted through the asynchronous circuit using a second synchronous-asynchronous interface of the application device, and transmit the data to the central control device via the asynchronous communication unit. The second synchronous-asynchronous interface may work according to the principle shown in FIG. 3B and FIG. 3C, which will not be repeatedly described herein.

Figure 8:
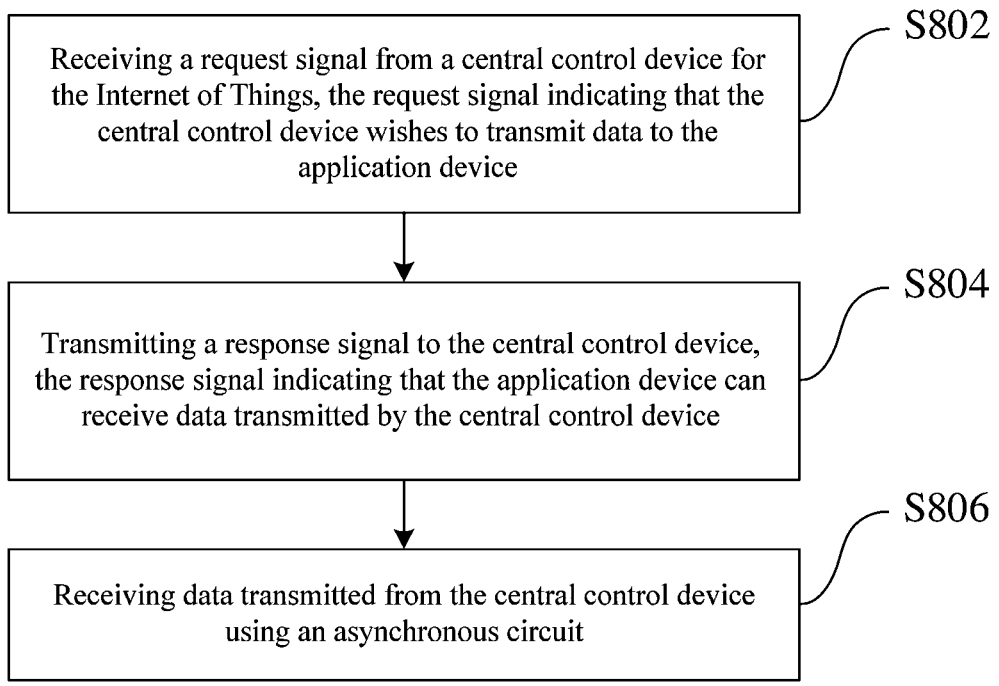
FIG. 8 shows a flowchart of a communication method for receiving data applied to an application device in the Internet of Things according to some embodiments of the present disclosure.

FIG. 8 shows a flowchart of a communication method for receiving data applied to an application device in the Internet of Things according to some embodiments of the present disclosure.

In step S802, a request signal from a central control device for the IoT may be received via a second asynchronous communication unit, the request signal indicating that the central control device wishes to transmit data to the application device.

In step S804, a response signal may be transmitted to the central control device via the second asynchronous communication unit, the response signal indicating that the application device is able to receive data transmitted by the central control device.

By implementing a handshake signal with steps S802 and S804, the application device can successfully receive data transmitted by the central control device.

In step S806, data transmitted from the central control device may be received via the second asynchronous communication unit. As mentioned earlier, data exchange between respective devices in the IoT may be achieved through the second asynchronous communication unit formed by an asynchronous circuit.

In some embodiments, the application device may receive data transmitted by the central control device through the second asynchronous communication unit, and convert the received data into a form that is easily processed by a synchronous circuit by a second synchronous-asynchronous interface, so that an application unit of the application device may perform subsequent processing such as encryption, storage, forwarding and the like on the received data based on a second clock signal.

With the central control device and the application device provided by the present disclosure, data communication between the central control device and a plurality of application devices may be performed through asynchronous circuits, thereby achieving higher stability and lower power consumption. Furthermore, since data transmission between the central control device and the application devices in the IoT system is not controlled by a global clock, data transmission between systems is unpredictable, which may prevent side-channel attacks based on time, making the system has higher security.

A computer-readable medium may take many forms, including tangible storage media, carrier wave media, physical transmission media and the like. Stable storage media may include: optical disks or magnetic disks, and other storage systems used in computers or similar devices that can implement the system components described in the figures. Unstable storage media may include dynamic memories, such as a main memory of a computer platform. Tangible transmission media may include coaxial cables, copper cables, and optical fibers, such as lines that form a bus inside a computer system. Carrier wave transmission media may transmit electrical signals, electromagnetic signals, acoustic signals, light signals and the like. These signals may be generated by methods of radio frequency or infrared data communication. Common computer-readable media include hard disks, floppy disks, magnetic tapes and any other magnetic media; CD-ROMs, DVDs, DVD-ROMs and any other optical media; punch cards and any other physical storage media containing an aperture pattern; RAMs, PROMs, EPROMs, FLASH-EPROMs and any other memory chips or magnetic tapes; carrier waves for transmitting data or instructions, cables or connection devices for transmitting carrier waves and any other program codes and/or data that can be read by computers. Many of these forms of computer-readable media will appear in processes of a processor executing instructions and transferring one or more results, to perform the communication methods applied to the central control device and the application device.

All or parts of software may sometimes communicate over a network, such as the Internet or other communication networks. This type of communication may load software from one computer device or processor to another, for example, from a server or host computer of an IoT communication system to a hardware platform of a computer environment, or other computer environment that implements a system, or a system with similar functions related to providing information required for the IoT communication system. Therefore, another medium capable of transmitting software elements may also be used as a physical connection between local devices, such as light waves, radio waves, electromagnetic waves, etc. that implement propagation through cables, optical cables, air and the like. Physical media used for carrying waves, such as electrical cables, wireless connections, optical cables and similar devices may also be considered as media carrying software. As used herein, unless tangible "storage" media is restricted, other terms referring to computer or machine "readable media" refer to media that participates in a processor's execution of any instructions.

Unless otherwise defined, all terms (including technical and scientific terms) used herein have the same meaning as commonly understood by one of ordinary skill in the art to which this application belongs. It should also be understood that terms such as those defined in ordinary dictionaries should be interpreted as having meanings consistent with their meaning in the context of relevant technologies, and should not be interpreted in an idealized or highly formal sense, unless explicitly such defined herein.

The above is a description of the present disclosure and should not be considered as a limitation thereof. Although several exemplary embodiments of the present disclosure have been described, those skilled in the art will readily understand that many modifications may be made to the exemplary embodiments without departing from the novel teachings and advantages of the present disclosure. Accordingly, all such modifications are intended to be included within the scope of the present disclosure as defined by the claims. It should be understood that the above is a description of the present disclosure and should not be considered as being limited to the particular disclosed embodiments, and modifications to the disclosed embodiments and other embodiments are intended to be included within the scope of the appended claims. This application is defined by the claims and their equivalents.

What is claimed is:

1. A central control device for Internet of Things, wherein the central control device comprises:
    a central control processor configured to perform a central control function of the central control device under control of a first clock signal;
    an asynchronous circuit configured to perform data communication between the central control device and a plurality of application devices in the Internet of Things;

a synchronous-asynchronous interface configured to perform data transmission between the central control processor and the asynchronous circuit, wherein, when the central control device is to transmit data to one application device of the plurality of application devices, the central control processor determines the data to be transmitted, and the synchronous-asynchronous interface converts the data into a form that is capable of being transmitted through the asynchronous circuit, and the asynchronous circuit transmits the converted data to the application device, and wherein the synchronous-asynchronous interface is further configured to:

receive a first data signal based on a first input data transmitted by the central control processor under the control of the first clock signal;

generate a second data signal and a third data signal for representing the first input data according to the received first data signal based on a predefined correspondence relationship of the first data signal, the second data signal, and the third data signal, wherein the second data signal and the third data signal are complementary;

transmit the second data signal and the third data signal to the asynchronous circuit, wherein the asynchronous circuit is configured to output a first output data corresponding to the first input data based on the second data signal and the third data signal.

2. The central control device of claim 1, wherein the central control processor is further configured to:

transmit a request signal to one of the plurality of application devices via the asynchronous circuit, the request signal indicating that the central control device is to transmit data to the application device;

receive a response signal from the application device via the asynchronous circuit, the response signal indicating that the application device is able to receive data transmitted by the central control device; and transmit data to the application device via the asynchronous circuit in response to the response signal.

3. The central control device of claim 1, wherein the central control processor is further configured to:

receive a request signal from one of the plurality of application devices via the asynchronous circuit, the request signal indicating that the application device is to transmit data to the central control device;

transmit a response signal to the application device via the asynchronous circuit, the response signal indicating that the central control device is able to receive data transmitted by the application device; and receive data transmitted from the application device via the asynchronous circuit.

4. The central control device of claim 1, wherein when the central control device is to receive data from one application device of the plurality of application devices, the synchronous-asynchronous interface is further configured to:

receive a fourth data signal and a fifth data signal, transmitted by the asynchronous circuit, based on a second input data, wherein the fourth data signal and the fifth data signal are complementary;

generate a sixth data signal for representing the second input data according to the received fourth data signal and fifth data signal;

transmit the sixth data signal to the central control processor, wherein the central control processor is configured to output a second output data corresponding to the second input data based on the sixth data signal under the control of the first clock signal.

5. The central control device of claim 1, wherein the asynchronous circuit is configured to perform an encryption operation on data to be transmitted.

6. The central control device of claim 5, wherein the encryption operation currently performed in the asynchronous circuit is scheduled so that a working power of the asynchronous circuit at each moment is constant.

7. The central control device of claim 6, wherein scheduling the encryption operation currently performed in the asynchronous circuit comprises:

scheduling the currently performed encryption operation based on a pre-measured change in power consumption of the asynchronous circuit over time when the asynchronous circuit performs the encryption operation according to an algorithm.

8. The central control device of claim 5, wherein the asynchronous circuit is further configured to perform a random operation in a process of performing data encryption to generate random power consumption.

9. The central control device of claim 1, wherein, a communication method applied to the central control device comprises:

transmitting a request signal to an application device for the Internet of Things via the asynchronous circuit, the request signal indicating that the central control device is to transmit data to the application device;

receiving a response signal from the application device via the asynchronous circuit, the response signal indicating that the application device is able to receive data transmitted by the central control device; and transmitting data to the application device via the asynchronous circuit in response to the response signal.

10. The central control device of claim 1, wherein, a communication method applied to the central control device comprises:

receiving a request signal from an application device for the Internet of Things via the asynchronous circuit, the request signal indicating that the application device is to transmit data to the central control device;

transmitting a response signal to the application device via the asynchronous circuit, the response signal indicating that the central control device is able to receive data transmitted by the application device; and receiving data transmitted from the application device via the asynchronous circuit.

11. An application device for Internet of Things, comprising:

an application control processor configured to perform an application function of the application device based on a second clock signal;

an asynchronous circuit configured to perform data communication between the application device and a central control device for the Internet of Things;

a synchronous-asynchronous interface configured to perform data transmission between the application control processor and the asynchronous circuit, wherein, when the application device is to transmit data to the central control device, the application control processor determines the data to be transmitted, and the synchronous-asynchronous interface converts the data into a form that is capable of being transmitted through the asynchronous circuit, and the asynchronous circuit transmits the converted data to the central control device, and wherein the synchronous-asynchronous interface is further configured to:

receive a first data signal based on a first input data transmitted by the application control processor under the control of the second clock signal;

generate a second data signal and a third data signal for representing the first input data according to the received first data signal based on a predefined correspondence relationship of the first data signal, the second data signal, and the third data signal, wherein the second data signal and the third data signal are complementary;

transmit the second data signal and the third data signal to the asynchronous circuit, wherein the asynchronous circuit is configured to output a first output data corresponding to the first input data based on the second data signal and the third data signal.

12. The application device of claim 11, wherein the application control processor is further configured to:

transmit a request signal to the central control device via the asynchronous circuit, the request signal indicating that the application device is to transmit data to the central control device;

receive a response signal from the central control device via the asynchronous circuit, the response signal indicating that the central control device is able to receive data transmitted by the application device; and transmit data to the central control device via the asynchronous circuit in response to the response signal.

13. The application device of claim 11, wherein the application control processor is further configured to:

receive a request signal from the central control device via the asynchronous circuit, the request signal indicating that the central control device is to transmit data to the application device;

transmit a response signal to the central control device via the asynchronous circuit, the response signal indicating that the application device is able to receive data transmitted by the central control device; and receive data transmitted from the central control device via the asynchronous circuit.

14. The application device of claim 11, wherein, a communication method applied to the application device comprises:

transmitting a request signal to a central control device for the Internet of Things via the asynchronous circuit, the request signal indicating that the application device is to transmit data to the central control device;

receiving a response signal from the central control device via the asynchronous circuit, the response signal indicating that the central control device is able to receive data transmitted by the application device; and transmitting data to the central control device via the asynchronous circuit in response to the response signal.

15. The application device of claim 11, wherein, a communication method applied to the application device comprises:

receiving a request signal from a central control device for the Internet of Things via the asynchronous circuit, the request signal indicating that the central control device is to transmit data to the application device;

transmitting a response signal to the central control device via the asynchronous circuit, the response signal indicating that the application device is able to receive data transmitted by the central control device; and receiving data transmitted from the central control device via the asynchronous circuit.

16. The application device of claim 11, wherein when the application device is to receive data from the central control device, the synchronous-asynchronous interface is further configured to:

receive a fourth data signal and a fifth data signal, transmitted by the asynchronous circuit, based on a second input data, wherein the fourth data signal and the fifth data signal are complementary;

generate a sixth data signal for representing the second input data according to the received fourth data signal and fifth data signal, based on a predefined correspondence relationship of the fourth data signal, fifth data signal and the sixth data signal;

transmit the sixth data signal to the application control processor, wherein the application control processor is configured to output a second output data corresponding to the second input data based on the sixth data signal under the control of the second clock signal.

17. An Internet of Things system comprising a central control device and a plurality of application devices, wherein the central control device comprises:

a central control processor configured to perform a central control function of the central control device based on a first clock signal;

a first asynchronous circuit configured to perform data communication between the central control device and the plurality of application devices;

a first synchronous-asynchronous interface configured to perform data transmission between the central control processor and the first asynchronous circuit, wherein, when the central control device is to transmit data to one application device of the plurality of application devices, the central control processor determines the data to be transmitted, and the first synchronous-asynchronous interface converts the data into a form that is capable of being transmitted through the first asynchronous circuit, and the first asynchronous circuit transmits the converted data to the application device, and wherein the first synchronous-asynchronous interface is further configured to:

receive a first data signal based on a first input data transmitted by the central control processor under the control of the first clock signal;

generate a second data signal and a third data signal for representing the first input data according to the received first data signal based on a predefined correspondence relationship of the first data signal, the second data signal, and the third data signal, wherein the second data signal and the third data signal are complementary;

transmit the second data signal and the third data signal to the first asynchronous circuit, wherein the first asynchronous circuit is configured to output a first output data corresponding to the first input data based on the second data signal and the third data signal each application device comprises:

an application control processor configured to perform an application function of the application device based on a second clock signal;

a second asynchronous circuit configured to perform data communication between the application device and the central control device for the Internet of Things;

a second synchronous-asynchronous interface configured to perform data transmission between the application control processor and the second asynchronous circuit, wherein, when the application device is to transmit data to central control device, the application control processor determines the data to be transmitted, and the second synchronous-asynchronous interface converts the data into a form that is capable of being transmitted through the second asynchronous circuit, and the second asynchronous circuit transmits the converted data to the central control device, and wherein the second synchronous-asynchronous interface is further configured to:

receive another first data signal based on another first input data transmitted by the application control processor under the control of the second clock signal;

generate another second data signal and another third data signal for representing the other first input data according to the received other first data signal based on a predefined correspondence relationship of the other first data signal, the other second data signal, and the other third data signal, wherein the other second data signal and the other third data signal are complementary;

transmit the other second data signal and the other third data signal to the second asynchronous circuit, wherein the second asynchronous circuit is configured to output another first output data corresponding to the other first input data based on the other second data signal and the other third data signal.

18. The Internet of Things system of claim 17, wherein when the central control device is to receive data from the one application device of the plurality of application devices, the first synchronous-asynchronous interface is further configured to:

receive a fourth data signal and a fifth data signal, transmitted by the first asynchronous circuit, based on a second input data, wherein the fourth data signal and the fifth data signal are complementary;

generate a sixth data signal for representing the second input data according to the received fourth data signal and fifth data signal, based on a predefined correspondence relationship of the fourth data signal, the fifth data signal and the sixth data signal;

transmit the sixth data signal to the central control processor, wherein the central control processor is configured to output a second output data corresponding to the second input data based on the sixth data signal under the control of the first clock signal.

19. The Internet of Things system of claim 18, wherein when the application device is to receive data from the central control device, the second synchronous-asynchronous interface is further configured to:

receive another fourth data signal and another fifth data signal, transmitted by the second asynchronous circuit, based on another second input data, wherein the other fourth data signal and the other fifth data signal are complementary;

generate another sixth data signal for representing the other second input data according to the received other fourth data signal and fifth data signal, based on a predefined correspondence relationship of the other fourth data signal, the other fifth data signal and the other sixth data signal;

transmit the other sixth data signal to the application control processor, wherein the application control processor is configured to output another second output data corresponding to the other second input data based on the other sixth data signal under the control of the second clock signal.

\* \* \* \* \*